(12) United States Patent
Ramesh et al.

(10) Patent No.: US 10,169,124 B2
(45) Date of Patent: Jan. 1, 2019

(54) UNIFIED OBJECT INTERFACE FOR MEMORY AND STORAGE SYSTEM

(71) Applicant: Samsung Electronics Co., Ltd., Suwon-si, Gyeonggi-do (KR)

(72) Inventors: Rakesh Ramesh, Stanford, CA (US); Hongzhong Zheng, Sunnyvale, CA (US); Krishna T. Malladi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 59 days.

(21) Appl. No.: 14/733,895

(22) Filed: Jun. 8, 2015

(65) Prior Publication Data

US 2016/0170649 A1 Jun. 16, 2016

Related U.S. Application Data

(60) Provisional application No. 62/092,816, filed on Dec. 16, 2014.

(51) Int. Cl.
*G06F 3/06* (2006.01)
*G06F 11/07* (2006.01)

(52) U.S. Cl.
CPC ........ *G06F 11/0718* (2013.01); *G06F 3/0608* (2013.01); *G06F 3/0623* (2013.01); *G06F 3/0641* (2013.01); *G06F 3/0667* (2013.01); *G06F 3/0679* (2013.01); *G06F 3/0688* (2013.01)

(58) Field of Classification Search
CPC .. G06F 11/0718; G06F 3/0641; G06F 3/0623; G06F 3/0608; G06F 3/0679; G06F 3/0688; G06F 3/0667
See application file for complete search history.

(56) References Cited

U.S. PATENT DOCUMENTS

| | | | |
|---|---|---|---|
| 6,240,498 B1 | 5/2001 | Dickes et al. | |
| 6,298,401 B1 | 10/2001 | Anderson | |
| 8,074,011 B2* | 12/2011 | Flynn | G06F 9/52 711/103 |
| 8,200,622 B2 | 6/2012 | Hoang | |
| 8,751,860 B2 | 6/2014 | Feeley et al. | |
| 9,329,991 B2* | 5/2016 | Cohen | G06F 12/0246 |
| 9,495,288 B2* | 11/2016 | Cohen | G11C 16/08 |
| 9,846,642 B2* | 12/2017 | Choi | G06F 12/0866 |
| 2005/0091469 A1* | 4/2005 | Chiu | G06F 3/0607 711/203 |
| 2005/0257074 A1* | 11/2005 | Alkove | G06F 21/10 713/193 |
| 2006/0101196 A1* | 5/2006 | Urmston | G06F 17/30982 711/108 |

(Continued)

*Primary Examiner* — Arpan P. Savla
(74) *Attorney, Agent, or Firm* — Renaissance IP Law Group LLP

(57) ABSTRACT

A data structure and a mechanism to manage storage of objects is disclosed. The data structure can be used to manage storage of objects on any storage device, whether in memory or some other storage device. Given an object ID (OID) for an object, the system can identify a tuple that includes a device ID and an address. The device ID specifies the device storing the object, and the address specifies the address on the device where the object is stored. The application can then access the object using the device ID and the address.

23 Claims, 10 Drawing Sheets

(56) References Cited

U.S. PATENT DOCUMENTS

| | | | | |
|---|---|---|---|---|
| 2007/0266059 A1* | 11/2007 | Kitamura | ............ | G06F 17/30997 |
| 2010/0070515 A1* | 3/2010 | Dutton | .............. | G06F 17/30091 |
| | | | | 707/755 |
| 2010/0275038 A1* | 10/2010 | Lin | ....................... | G06F 21/602 |
| | | | | 713/193 |
| 2011/0093726 A1* | 4/2011 | Worthington | ......... | G06F 1/3225 |
| | | | | 713/320 |
| 2012/0011340 A1* | 1/2012 | Flynn | .................. | G06F 12/0246 |
| | | | | 711/171 |
| 2013/0339314 A1* | 12/2013 | Carpentier | ............ | G06F 3/0641 |
| | | | | 707/692 |
| 2013/0339567 A1* | 12/2013 | Carpentier | .......... | G06F 11/0709 |
| | | | | 711/4 |
| 2014/0068183 A1* | 3/2014 | Joshi | .................. | G06F 12/0866 |
| | | | | 711/114 |

\* cited by examiner

UNIFIED OBJECT INTERFACE FOR MEMORY AND STORAGE SYSTEM

RELATED APPLICATION DATA

This application claims the benefit of U.S. Provisional Patent Application Ser. No. 62/092,816, filed Dec. 16, 2014, which is hereby incorporated by reference for all purposes.

FIELD

The inventive concept pertains to storage, and more particularly to uniting management of multiple storage devices.

BACKGROUND

Object-oriented programming is a dominant software development paradigm in the industry today, and has been so for the last decade. The notion of an object as a real-world abstraction that represents an entity and its supported methods appeals for developing clean, extensible and modular software in today's rapidly evolving codebase. On the other hand, the evolution in memory system architecture has been largely stagnant, with address-based schemes being the norm and indirection being the popular form of hardware abstraction to the software. But the widening gap between the performance of the CPU and the memory, the cost of indirection, and low hardware intelligence has made object-oriented software less efficient than raw imperative programs, making them less appealing to build production quality code.

On the other hand, the semiconductor industry is moving into unchartered territory with transistor feature sizes scaling down to a few atoms and reaching the threshold limits of Moore's Law. The impact of the scaling limits will be seen most heavily in Dynamic Random Access Memory (DRAM) technology since the DRAM uses the minimum sized transistors to build a memory array and is most reliant on process scaling to provide denser and higher capacity memory systems. Therefore, DRAM designers are trying to propose alternative technologies and architectures to ensure that the cost per bit of the new memory system remains the same while guaranteeing reasonable performance compared to existing DRAM. Emerging Non-Volatile Memory (NVM) technologies, like Phase Change Memory (PCM), Spin-Transfer Torque Magnetic RAM (STT-MRAM), Resistive RAM (RRAM), etc., are largely seen as the alternative solution to solve the gap in the performance and the cost per bit in the memory and storage stack.

With the emergence of new NVM technologies with faster random access and scope for byte-level granularity, the separation between the memory and storage has considerably thinned. Coupled with the growth of Big Data applications in modern datacenters, there is a need to rethink the way the hardware interface is designed to access memory and storage. The inefficiencies mainly arising due to the mismatch in the way software objects are handled by the hardware, and the multiple layers of indirection posed by the Virtual Memory and the File System interface, need to be addressed to build a fast scalable unified memory and storage.

DETAILED DESCRIPTION

Figure 1:
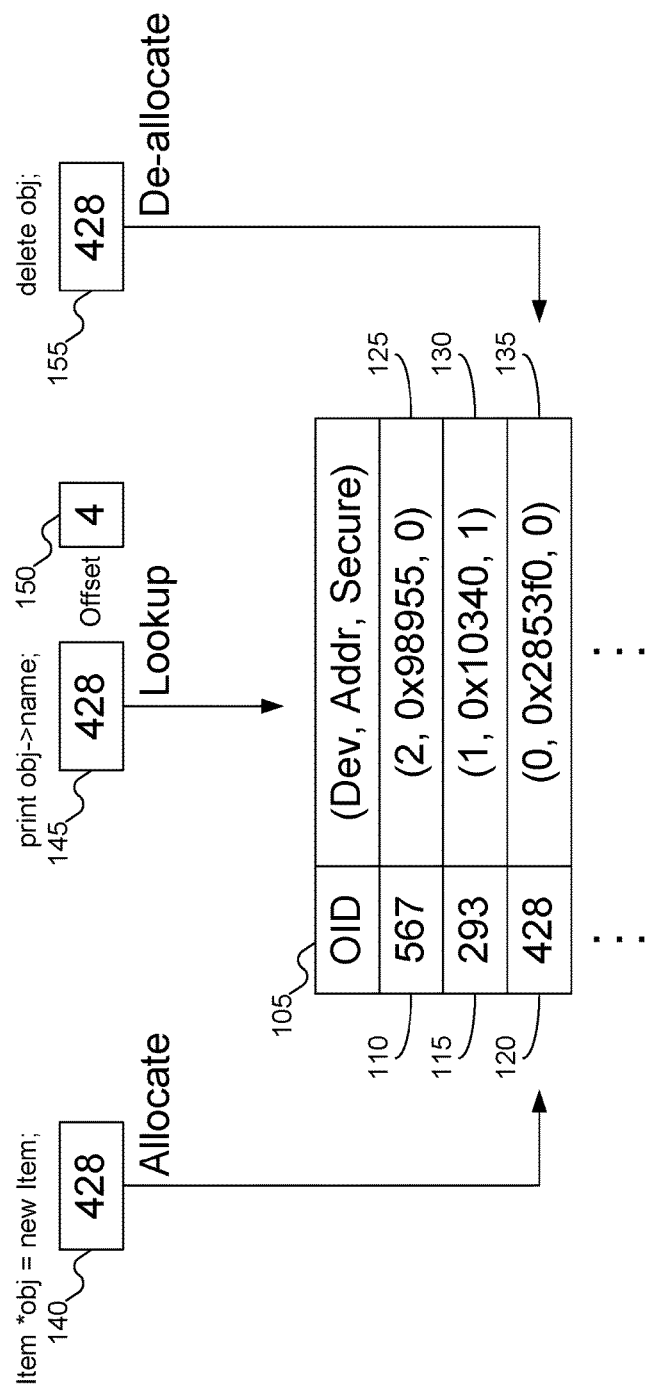
FIG. 1 shows an object table used to map object IDs to tuples specifying where the object is stored, according to an embodiment of the inventive concept.

In current technology, memory addressing and file storage addressing can be handled differently. Memory access typically can be achieved via instructions directed to the central processing unit (CPU). File storage access, on the other hand, typically can be achieved by sending instructions to the file system. Memory access typically can be synchronous, whereas file storage access typically can be asynchronous. Further, there can be differences even among storage devices. Different file storage devices can use different models to access data. For example, solid state devices can access files using the physical address of the file, whereas hard disk drives can access files based on the sector/angle where the file is stored.

The size of the data being stored can also be pertinent. Data accessed from memory can be accessed in relatively small chucks, whereas hard disk drives can be accessed in blocks whose size often depends on the size of the disk. Factors such as these have led to different techniques being used to access data from different devices.

A Unified Object-based Interface (UOI) combines the addressing mechanisms of the main memory and the storage into a uniform object-oriented space similar to a key-value store. Because the UOI unifies addressing to both memory and storage, in general the terms "memory" and "storage" are both intended to refer to all ways to store data, without implying a specific form of storage. But in some contexts, these terms might not refer to all forms of storage. Every object can be given a uniquely identifiable Object ID (OID) that is used as a key to obtain the value from the memory/storage device that currently holds the data. The OIDs can be drawn from a global identifier space, which can be managed by a kernel. The UOI mechanism uses intermediary indirection tables called Object Tables (OTB) that translate the unique OID to a corresponding tuple including a Device ID and Address that is fed to the appropriate hardware controller to access the data required by the program.

The OTB replaces the page table mechanism in hardware and can be exposed to the operating system to decide the allocation and the migration policies on object creation and access. The operating system can also manage the persistence barrier and can utilize hints from the software application to place data in fast, volatile memory or slow, persistent memory, and can migrate data on memory commit operations. The unique OID space can also be managed by the kernel memory management unit (MMU) that allocates new objects with fresh OIDs and maps them to free locations in the memory/storage system. Persistent objects like files, database tables, etc. can provide uniquely identifiable string names (POID) that are converted to the key-space by hashing them to lookup in the OTB. The metadata for the OTB can be distributed among the devices and has multiple levels to guarantee faster lookup.

An application can interact with the hardware through the UOI either directly through an interface that provides functions to explicitly allocate, migrate and delete objects from the underlying device, or transparently through system call interfaces that handle responsibility of data management. The UOI mechanism can also be used jointly with run-time environments to support key functionalities like Garbage Collection, Security, Quality of Service (QoS) Guarantees, etc.

The UOI combines the addressing mechanism to the main memory and the storage into a uniform object-oriented space similar to a key-value store. An object can be defined as a logical entity defined by the software and is not restricted to typical data structure-based objects defined by, for example, the java/C++ standard. The granularity of the object can vary from simple structures, like a Node in a Linked-List or an Item in a Hash-Table, to aggregate structures, like Arrays, Queues, and Binary Trees, all the way up to a Database Tables or a File in cold storage. Every object defined by the software can be given a unique identifier OID that is used as a key for looking up the object in the memory/storage.

The intermediate step in the data retrieval process is Object ID translation, which is handled can be the OTB, which maintains a one-on-one translation between the OID and the (Device ID, Address) tuple. The Device ID specifies the physical device(s) that currently holds the object, be it DRAM, NVM, SSD, or HDD, among other possibilities. The Address corresponds to the device-specific location which is used by the controller to access the data. The OTB can also hold additional metadata for each object in the form of size, persistence requirement, security, sharing, data hash for de-duplication, etc.

FIG. 1 shows an OTB that can be used to manage where objects are stored, according to an embodiment of the inventive concept. In FIG. 1, object table 105 shows a data structure that maps OIDs to tuples. In FIG. 1, object table 105 is shown with three rows, mapping OIDs 110, 115, and 120 to tuples 125, 130, and 135, respectively. A person of ordinary skill in the art will recognize that object table 105 can include any number of rows.

Instruction 140 shows the creation of a new object, assigned the OID of 428. When the allocate instruction is implemented, space for the object is allocated on a device (not shown in FIG. 1). As described above, this allocation can be handled by the kernel. A row is then added to object table 105, associating the OID of 428 with the device ID and address where the object is stored. Using this combination of device ID and address, the object can be accessed. As discussed above, the application can directly access the object via the device hardware (for example, though the UOI), or via system calls.

Instruction 145 shows the access of the object with OID 428. In instruction 145, data is being read from the object, but a person skilled in the art will recognize that instructions can just as easily access the object to write data. In executing instruction 145, as with every access of the object, the process can perform an indirect load on the OID (instead of the virtual address) which performs a look up in object table 105 to find the object location and fetches the data from storage. Because instruction 145 is only accessing a field within the data structure of the object, offset 150 can specify an offset from the base address of the object, where the desired data starts. In the example shown, offset 150 is 4 bytes. Offset 150 can be added to the base address of the object, drawn from tuple 135, to access just the desired data from the object.

Instruction 155 shows the deletion of the object with OID 428. Because the object is being deleted, the space allocated for the object on the device can be de-allocated, and the row in object table 105 can be removed. As described above, this de-allocation can be handled by the kernel.

Note that in FIG. 1, the use of object table 105 is the same regardless of whether the object is stored in memory, in non-volatile storage, on an SSD, on a hard disk drive, or any other type of storage device. The specifics of how the devices operate to store or retrieve data might vary, but the tuple in object table 105 is structured the same.

In the above description, the tuples stored in object table are described as storing the device ID and the address, as this is the minimum information needed to access an object. But it is possible for tuples to store additional information. For example, tuples 125, 130, and 135 are shown as including three entries. The third entry can represent whether an object is to be stored in a secure manner. The traditional memory- and storage-separated world was very prone to software directed threats because threat programs were able to snoop parts of the volatile unencrypted memory to retrieve potentially useful information to unlock the encrypted storage. Memory fences protect parts of the memory address space from being utilized, and force the secure programs to rewrite software to utilize these fences. But the fence mechanism is still open to software-directed threats. Memory fences can also be very inefficient because scratchpad data and temporary allocations are also forced in the fenced area.

With the UOI mechanism, the software can supply an argument during object creation that indicates that the object is secure, and hence the kernel can allocate the object in the fenced area. The software-oblivious approach to secured objects prevents software-directed threats from accessing the fenced address space, and the hardware can provide a very compact, efficient way to organize the fenced region of memory.

The tuple can also specify whether data is to be secured or not, which assists the UOI in determining how to access the data in the object. For example, as described above, the data can be stored in the fenced address space. Alternatively, the data can be stored outside a fenced address space but in an encrypted manner, using any desired encryption algorithm. For example, the kernel or UOI can encrypt the data before writing to the storage device, and can decrypt the data after reading. Any program that snoops the storage device will only find encrypted data: there is no indication in unencrypted memory how to decrypt the data. And because management of the security protocol is separate from the application, there is no concern that (expensive) secure storage is going to be used to store data that does not need to be secured.

In addition to specifying whether data is to be secure or not, tuples 125, 130, and 135 can specify how the data is to be secured. For example, data that is considered sensitive but not very important can be secured using a weaker encryption algorithm, whereas highly sensitive and important data can be encrypted using a stronger encryption algorithm. Tuples 125, 130, and 135 can specify the specific encryption algorithm used to store a particular object.

Figure 2:
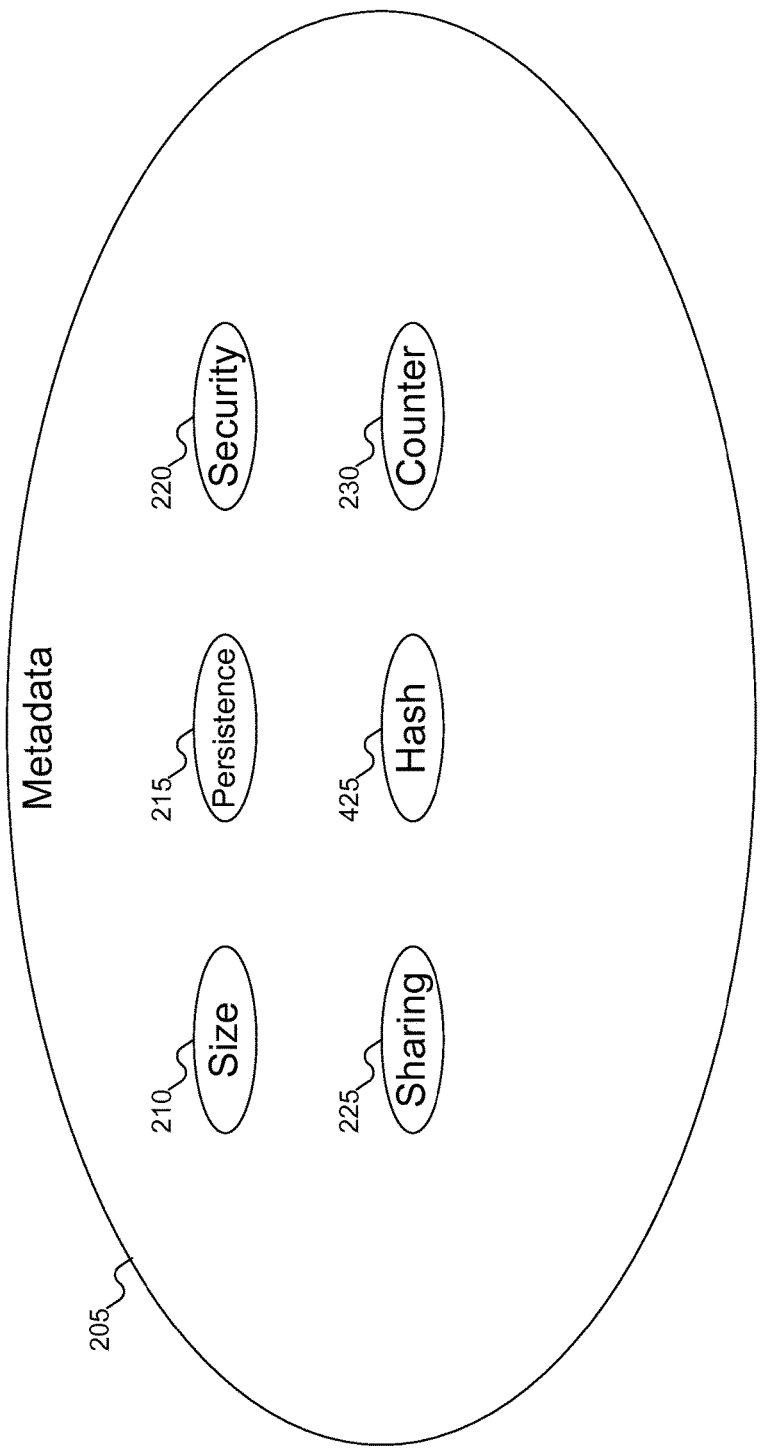
FIG. 2 shows metadata that can be used in the computer system of FIG. 3.

FIG. 2 shows some examples of metadata 205 that can be stored in tuples 125, 130, and 135. Different metadata can include size 210 of the object, persistence 215—that is, whether the object should continue to be stored on the storage device even when the application is not running—of the object, security 220 for the object, sharing 225—whether the object is for the exclusive use of the application that created the object or if it is to be shared with other applications/processes—of the object, a hash of the object (hashes are discussed further with reference to FIG. 4 below), and access counter 230—which stores how many times the object has been accessed. In addition, there is no reason that a tuple should be limited to only one additional entry in the tuple for metadata: different metadata can be combined in a tuple in any combination desired.

To elaborate on access counter 230, the access counter can reflect how often the object is accessed. The access counter could store simply a number of times the data object has been accessed, or it could store how often the object is accessed, relative to accesses of other data objects. The access counter can also store an indicator of the last time the object was accessed, among other possibilities. By tracking accesses of the data object, the system can determine if the object is frequently accessed. If the object is accessed enough times or with great enough frequency, that fact implies that the object may be better stored in faster data storage (for example, in DRAM, rather than on an SSD, or on an SSD, rather than on an HDD). On the other hand, if an object is accessed relatively infrequently, the system might be better off storing the object in slower data storage (for example, on an SSD or HDD, rather than in DRAM). Thus, the system can make determinations about when (and what data) to migrate from one storage to another. Migrating can involve allocating new space for the object on another storage device, copying the data into the space on the new storage device, de-allocating the space on the original storage device, and changing the tuple in the OTB to reflect the new location of the object. Migration can be performed without the application being aware that the data was migrated.

Access counter 230 can be compared to thresholds to determine whether to migrate an object. There can be different thresholds associated with different devices: as access counter 230 increases, an object can be migrated across multiple different storage devices. In addition, access counter 230 can cross a threshold in either direction. That is, if access counter 230 increases sufficiently, the object can be migrated to a faster or higher priority storage device. Alternatively, if access counter 230 decreases sufficiently, the object can be migrated to a slower or lower priority storage device. (In this context, the term "priority" can refer to any criteria that can be used to rank the storage devices.)

Returning to the UOI, the UOI mechanism provides software intelligence to the hardware without needing to expose too many layers or depth to tie the software to the particular hardware. The hardware controller can utilize the UOI to hide basic details about the hardware organization, such as the persistence barrier. Although many reliable-critical applications, such as databases, require data integrity, most programs utilize scratchpad and read-only data that can be optimally accelerated using in-memory processing using DRAM and NVM technologies. For example, to provide a comparable performance with lower cost memory, NVM technology can utilize faster DRAM to cache hot data. The UOI mechanism can track "hot" and "cold" objects by maintaining access counters (as discussed above) and migrating hotter objects to the DRAM while maintaining the cold objects in NVM. Overall, this leads to a more energy efficient system since the NVM technology may consume almost no static energy compared to the DRAM.

Figure 3:
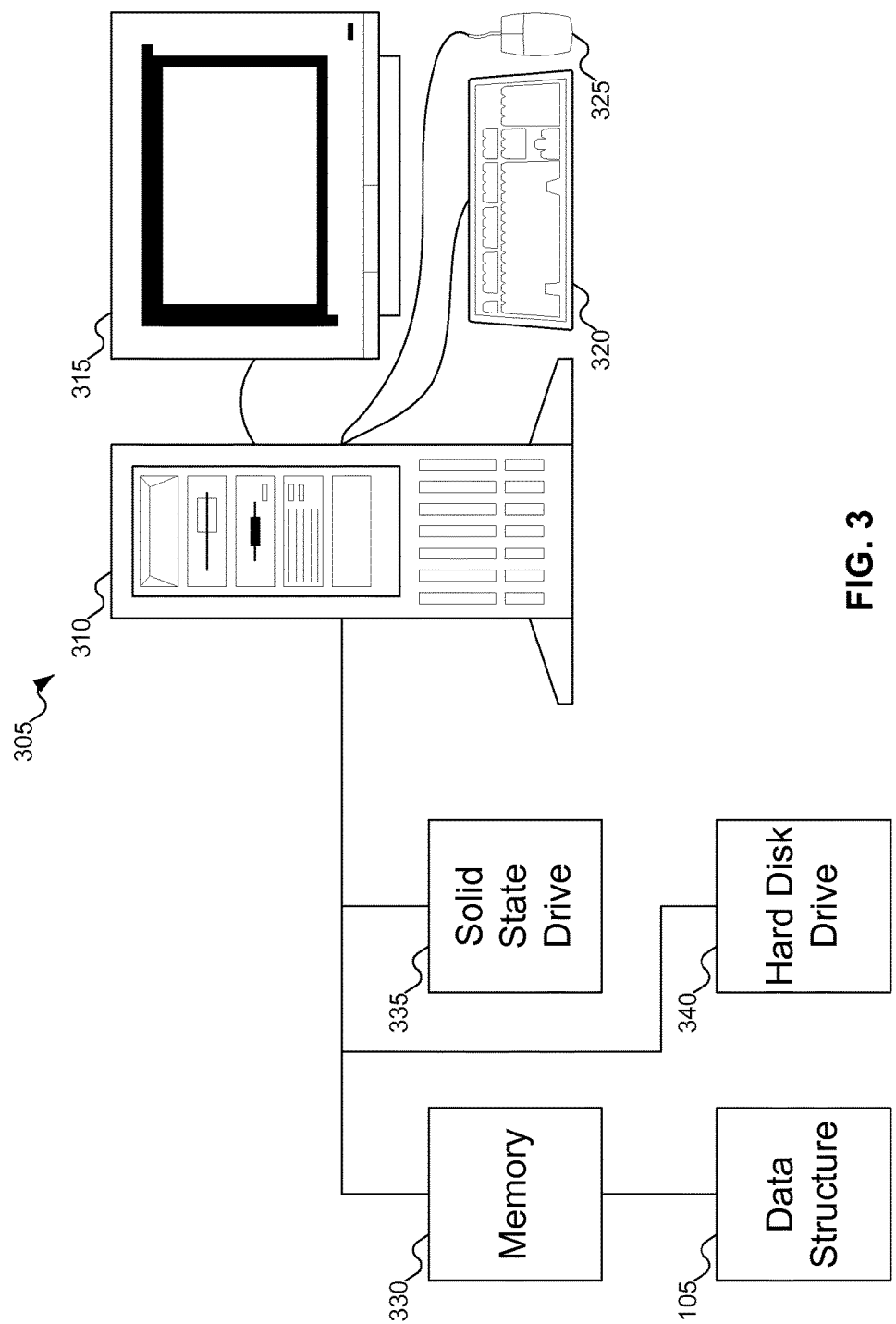
FIG. 3 shows a computer system with multiple storage solutions using the object table of FIG. 1.

FIG. 1, discussed above, shows a data structure that can be used to unify object access. FIG. 3 shows a computer system using the data structure, according to an example embodiment of the inventive concept. In FIG. 3, computer system 305 is shown as including computer 310, monitor 315, keyboard 320, and mouse 325. A person skilled in the art will recognize that other components can be included with computer system 305: for example, other input/output devices, such as a printer, may be included. In addition, computer system 305 can include conventional internal components (not shown in FIG. 3): for example, a central processing unit. Although not shown in FIG. 3, a person skilled in the art will recognize that computer system 305 can interact with other computer systems, either directly or over a network (not shown) of any type. Finally, although FIG. 3 shows computer system 305 as a conventional desktop computer, a person skilled in the art will recognize that computer system 305 can be any type of machine or computing device capable of providing the services attributed herein to computer system 305, including, for example, a laptop computer, a tablet computer, a personal digital assistant (PDA), or a smart phone, among other possibilities.

Computer system 305 can include memory 330 and storage devices 335 and 340. For example, storage device 335 is shown as a solid state drive, and storage device 340 is shown as a hard disk drive. Computer system 305 can include any number of storage devices, and can include storage devices of any desired types: FIG. 3 merely illustrates one possible embodiment of the inventive concept. Computer system 305 can also include data structure 105, to manage access of data objects as described herein.

As described above, the kernel can handle object allocation and de-allocation. But instead of requiring every application to be rewritten to use new instructions to have the kernel allocate and de-allocate objects, the kernel can intercept any older-style allocation/de-allocation commands. For example, malloc( ) is often used to allocate memory. The kernel can intercept any malloc( ) commands and substitute object allocation commands in their place. Similarly, any fopen( ) commands used to open files on a storage device can be intercepted and replaced with object open commands. De-allocation and file close commands, amongst others, can be similarly intercepted.

Figure 4:
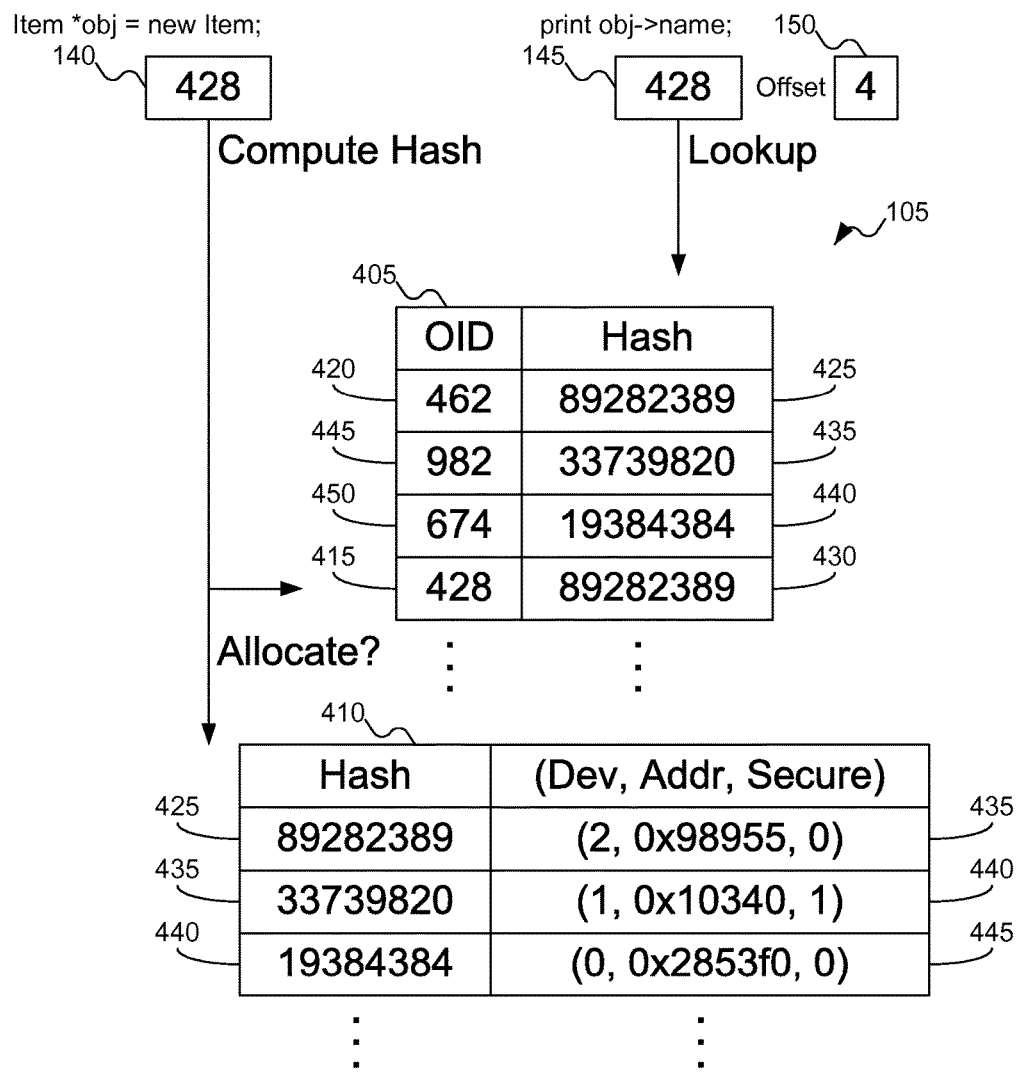
FIG. 4 shows an alternative object table to map object IDs to tuples specifying where the object is stored, according to another embodiment of the inventive concept.

FIG. 1 above shows one example embodiment of the inventive concept. But the data structure shown in FIG. 1 is not the only data structure that can be used to manage objects in storage. FIG. 4 shows an additional example of another embodiment of the inventive concept, with a different data structure.

In FIG. 4, table 405 provides information relating to objects in storage. But instead of mapping the OID to a tuple, table 405 maps the OID to a hash value. This hash value can be, for example, a hash of the data stored in the object, and can be generated using any desired hash algorithm, such as a universal hash algorithm or a cyclic redundancy check (CRC). Once the hash value corresponding to the OID has been determined, table 410 can be accessed, which maps the hash value to the tuple including the device ID and address storing the object.

It might seem that using tables 405 and 410 is a less efficient way of accessing the data for the object. Two tables are needed to store data, increasing the overall storage requirements and execution time. However, the data structure of FIG. 4 provides an advantage: it is possible to identify and remove data duplicates from storage.

For example, consider again instruction 140, as shown in FIG. 4. To perform the memory allocation, the system needs to compute the hash of the data stored in the object. This hash can then be the target data of table 405, and can be a search key for table 410. But note that, in table 405, the hash associated with OID 428 (415) is the same as the hash associated with OID 462 (420): put another way, note that hash values 425 and 430 are the same. Since these two object store the same data, they represent the same object. But since the system has already allocated storage for the object with OID 462, there is no need to allocate storage for the object with OID 428. The system can then map requests for the data from the object with OID 428 the same as the object with OID 462. (Of course, such a system assumes that the data is not changed, or else a change to the data in "one" object would necessarily change the data in the "other" object as well.)

In addition to preventing the proliferation of unneeded objects, the data structure shown in FIG. 4 can permit hardware control to perform de-duplication to compact the footprint of the application. The hash values can be used to reverse index objects by their data and share objects with more ease. De-duplication can improve the performance of capacity-sensitive applications and big data analytics which are largely memory-bound with large working set sizes. This approach can be useful where data de-duplication is performed on the system occasionally, rather than checking for duplication at the time the object is created. For example, storage might be allocated for the object before the data is known, in which case the hash value for the object cannot be effectively computed at the time the object is created. Later examination of the hash values can then identify objects that are duplicates, and eliminate the duplicates.

It is worth noting that FIG. 4 represents one possible way to organize the object table to include hashes of the data in the objects. But a person skilled in the art will recognize that there are other ways in which the object table can be organized. For example, table 105 of FIG. 1 could be modified simply to include an additional column, storing the hash data. In that manner, a single lookup can retrieve both the tuple and the hash data. Other embodiments of the claimed inventive concept that can organize the data are also possible.

Figure 5A:
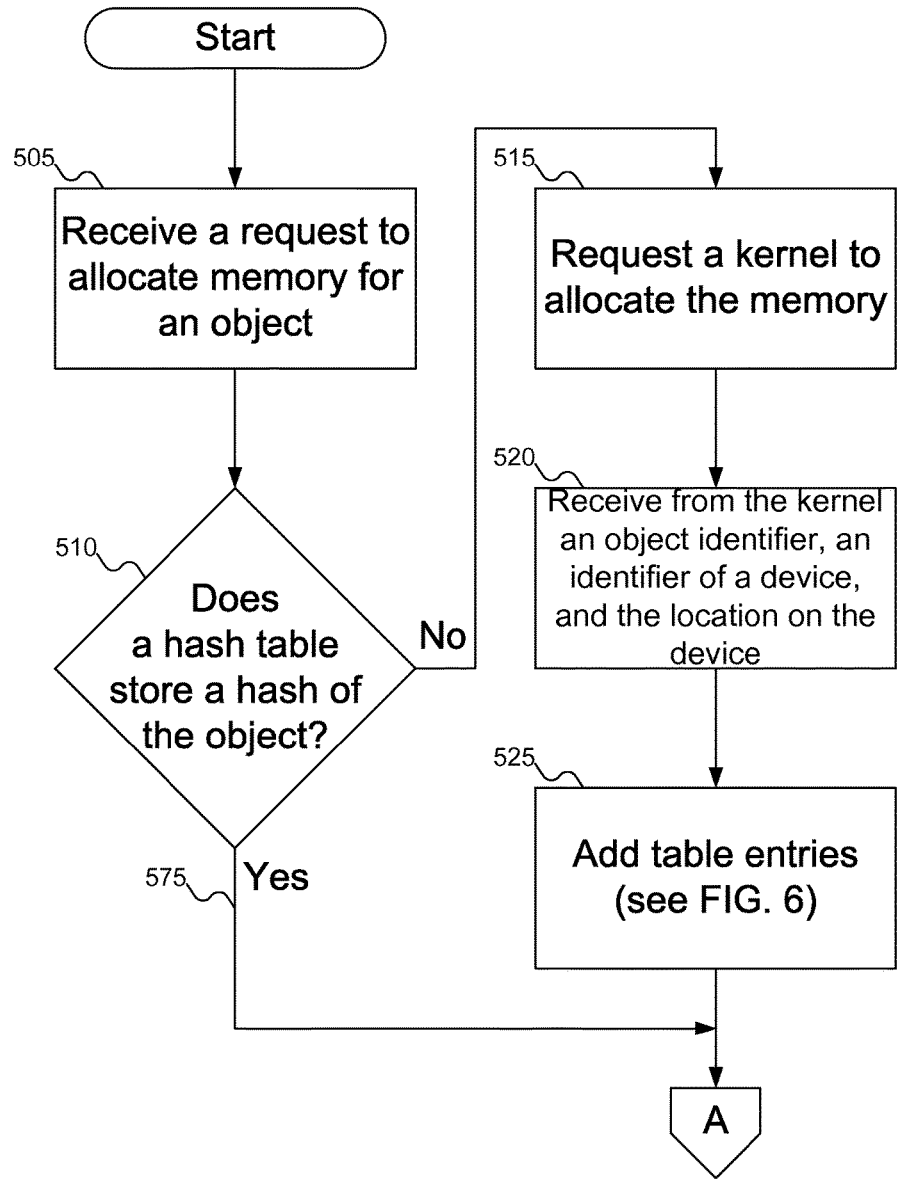
FIGS. 5A-5C show a flowchart of an example procedure for using object-oriented storage in the computer system of FIG. 3, according to an embodiment of the inventive concept.
Figure 5B:
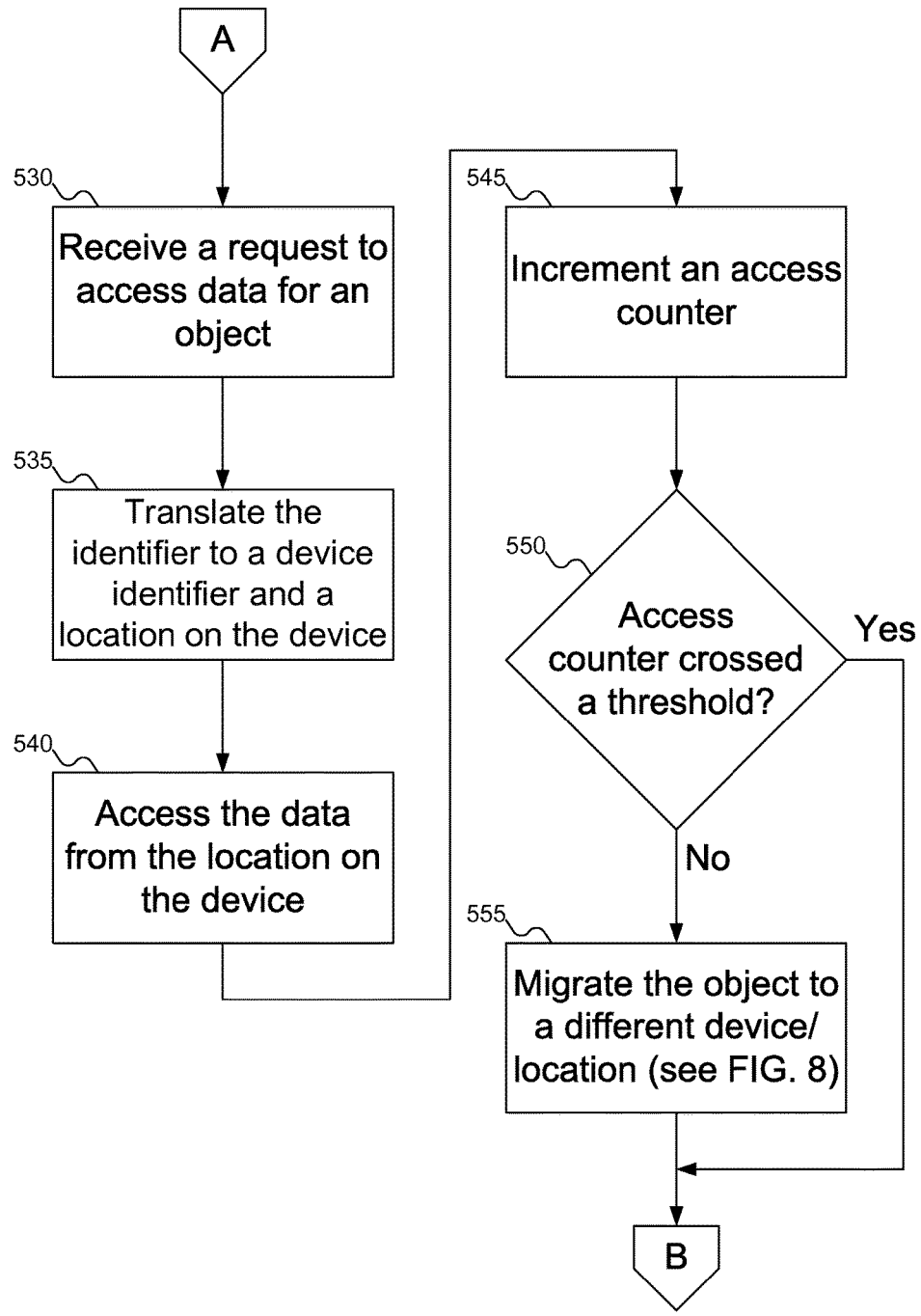
Figure 5C:
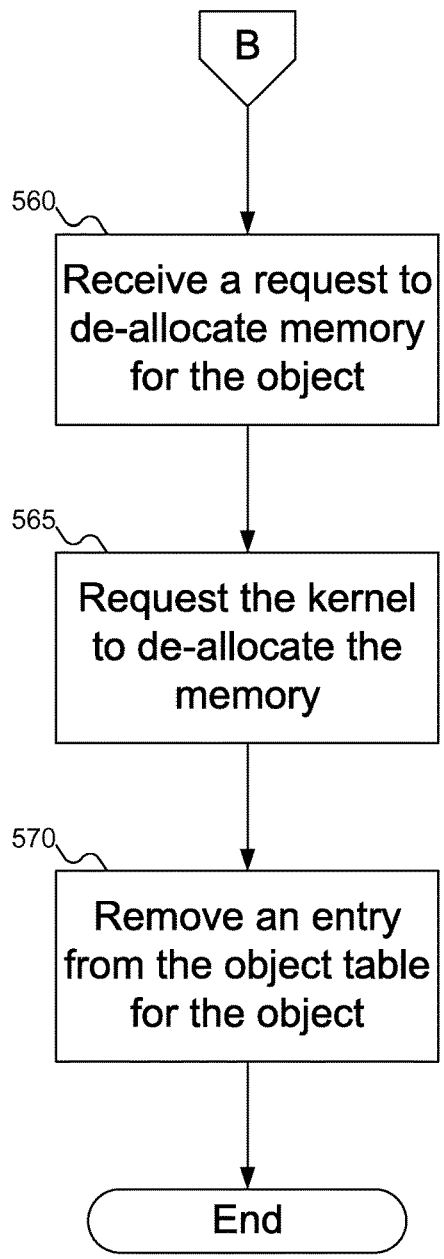

FIGS. 5A-5C show a flowchart of an example procedure for using object-oriented storage in the computer system of FIG. 3. In FIG. 5A, at block 505, the system can receive a request to allocate storage for an object. At block 510, the system can determine if the OTB (such as table 105 or table 405) already stores a hash of the data in the object. Note that this block can be generalized: the system can determine if an entry exists in the object table for the object, rather than looking specifically for a hash of the data. But by searching for a hash of the data stored in the object, the system can avoid creating a redundant data object. If the system cannot find an entry in the object table for the object, then at block 515 the system can allocate space for the object in some storage (memory, NVM, SSD, HDD, etc.). At block 520, the system can receive the OID for the object, the device ID where the data is stored, and the address on the device where the data can be found. As described above, the tuple stored in the OTB can include more information than just the device ID and the address: the additional metadata typically can come from the application requesting the storage, but could come from other sources as well. At block 525, the system can add entries to the OTB to reflect where the object is stored.

Note also that at block 510, if the system determines that it is already storing the object, then blocks 515, 520, and 525 can be skipped.

At block 530 (FIG. 5B), the system can receive a request to access data from the object. As described above, this access can be either read access or write access, without any loss of generality. At block 535, the system can translate the object ID into a tuple identifying the device ID and the address where the object is stored. At block 540, the data for the object can be accessed from the appropriate device.

At block 545, the system can increment an access counter to reflect another access of the object. As described above with reference to FIG. 2, the access counter can be stored as metadata within the tuple, although the access counter could also be stored elsewhere by the system. At block 550, the system can determine if the number of accesses of the object have crossed a threshold. If so, then at block 555 the system can migrate the data to an appropriate alternative storage device.

Regardless of whether or not the data was migrated, at block 560 (FIG. 5C), the system can receive a request to de-allocate the storage for the object. At block 565, the system can de-allocate the storage for the object. Finally, at block 570, the system can remove the entries from the OTB relating to the object storage.

In FIGS. 5A-5C (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. For example, after blocks 550 and 555 are complete, the system can return to block 530 to process another request to access an object. All such variations of the flowcharts are considered to be embodiments of the inventive concept, whether expressly described or not.

Figure 6:
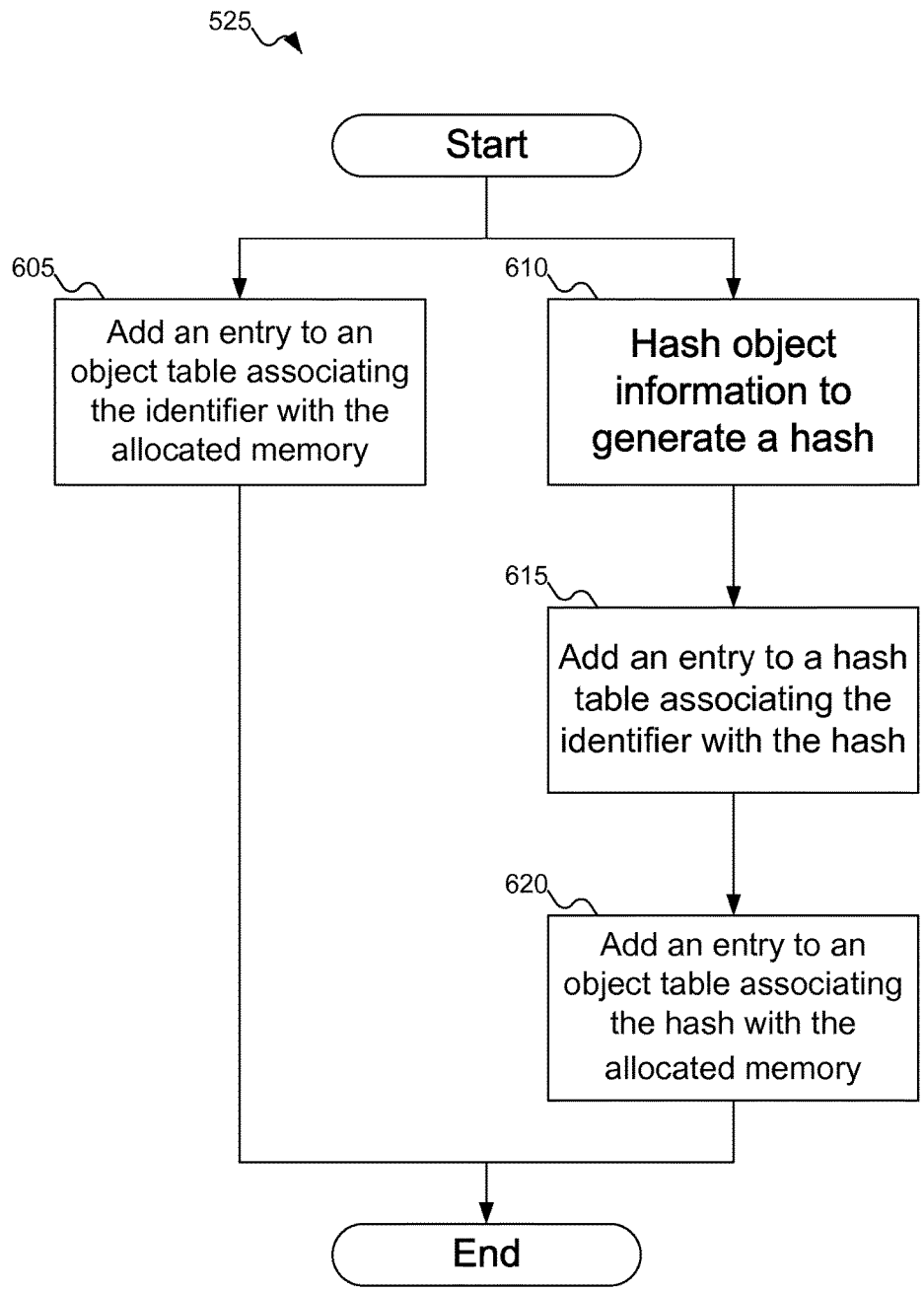
FIG. 6 shows a flowchart of an example procedure that can be used with the data structures of FIGS. 1 and 4.

FIG. 6 shows a flowchart of an example procedure that can be used with the data structures of FIGS. 1-4. This flowchart corresponds generally to block 525 of FIG. 5A. At block 605, the system can add an entry to the object table associating the object identifier with the tuple identifying where the object is stored. Alternatively, at block 610, the system can hash the data stored in the object. At block 615, the system can associate the object ID with the generated hash, and at block 620 the system can associate the generated hash with the tuple identifying where the object is stored.

Figure 7:
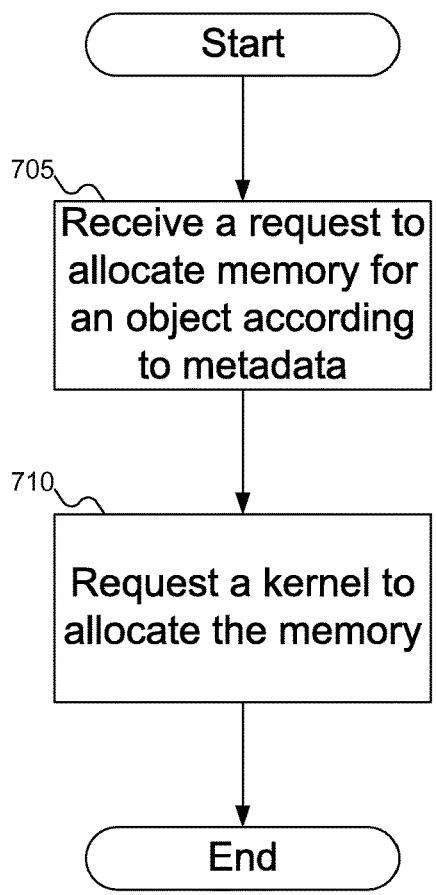
FIG. 7 shows a flowchart of an example procedure to allocate storage for an object.

FIG. 7 shows a flowchart of an example procedure to allocate storage for an object, according to an embodiment of the inventive concept. In FIG. 7, block 505 of FIG. 5A can be modified as in block 705 to receive a request to allocate the storage for the object based on metadata provided by the application. Then, block 515 of FIG. 5A can be modified as in block 710 to allocate the storage based on the metadata.

As an example of how metadata can affect the allocation of storage for an object, recall that the application can specify that an object is to be stored in a secure manner. If the application requests that the object be stored securely, then the system can encrypt the data in some manner or can allocate storage for the object in a fenced area of a storage device.

Another example of how metadata can affect the allocation of storage for an object is that the application might request that the object be stored on a particular device. If the application requests storage on a particular device, the system should honor that request and not allocate storage on another device, nor should the system migrate the data away from the requested device.

It is also possible that an application might specify metadata that is impossible to satisfy in requesting allocation of storage. For example, the application might request that the object be stored on a device with a minimum latency that could only be satisfied by DRAM, but also request that the object be stored on a non-volatile storage device. Since DRAM is the only device that would satisfy the minimum latency, but DRAM is volatile storage, the request cannot be satisfied. In that case, the system can make a choice how to allocate the storage—for example, by eliminating metadata conditions until the request can be satisfied: in the order presented, randomly, or by determining a minimum number of conditions that would need to be eliminated to leave a request that can be satisfied—or the system can refuse the request and abort the allocation request, among other possibilities.

Figure 8:
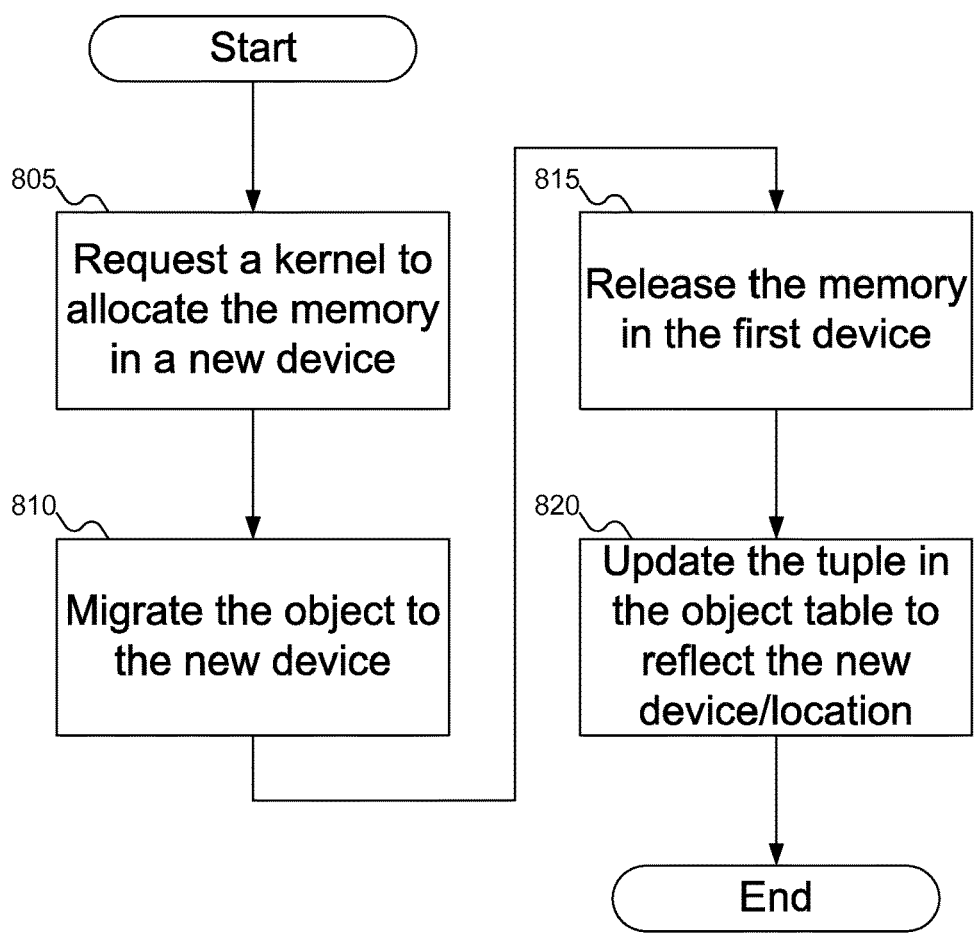
FIG. 8 shows a flowchart of an example procedure to migrate an object from one storage device to another.

FIG. 8 shows a flowchart of an example procedure to migrate an object from one storage device to another. This flowchart corresponds generally to block 555 of FIG. 5B. In FIG. 8, at block 805, the system can allocate new storage for the object being migrated. At block 810, the system can copy the data from the old storage to the new storage for the object. At block 815, the system can release the old storage used for the object. At block 820, the system can update the tuple in the OTB to reflect the new storage location for the object.

Note that the flowchart of FIG. 8 operates regardless of the performance characteristics of the storage device to which the object is being migrated. Whether the object is being migrated from DRAM to SSD, for example, or from HDD to DRAM, the steps of the flowchart are the same.

Embodiments of the inventive concept can extend to the following statements, without limitation:

An embodiment of the inventive concept includes a memory management device, comprising: a memory; and a data structure stored in the memory, the data structure including: an identifier of an object; and a tuple including a device identifier and a location on the device.

An embodiment of the inventive concept includes a memory management device, comprising: a memory; and a data structure stored in the memory, the data structure including: an identifier of an object; and a tuple including a device identifier, a location on the device, and metadata.

An embodiment of the inventive concept includes a memory management device, comprising: a memory; and a data structure stored in the memory, the data structure including: an identifier of an object; and a tuple including a device identifier, a location on the device, and metadata, the metadata drawn from a set including a size of the object, a persistence of the object, a security for the object, a sharing for the object, a hash for the object, and an access counter.

An embodiment of the inventive concept includes a memory management device, comprising: a memory; a data structure stored in the memory, the data structure including: an identifier of an object including a hash; and a tuple including a device identifier and a location on the device, and a second data structure, the second data structure including: a second identifier of the object; and the hash.

An embodiment of the inventive concept includes a system, comprising: a computer; a first storage device coupled to the computer; a second storage device coupled to the computer; and a data structure stored in a storage coupled to the computer, the data structure including: an identifier of an object; and a tuple including a device identifier for one of the first storage device and the second storage device and a location on the device.

An embodiment of the inventive concept includes a system, comprising: a computer; a first storage device coupled to the computer; a second storage device coupled to the computer; and a data structure stored in a storage coupled to the computer, the data structure including: an identifier of an object; a tuple including a device identifier for one of the first storage device and the second storage device and a location on the device, and metadata.

An embodiment of the inventive concept includes a system, comprising: a computer; a first storage device coupled to the computer; a second storage device coupled to the computer; and a data structure stored in a storage coupled to the computer, the data structure including: an identifier of an object; a tuple including a device identifier for one of the first storage device and the second storage device and a location on the device, and metadata, the metadata drawn from a set including a size of the object, a persistence of the object, a security for the object, a sharing for the object, a hash for the object, and an access counter.

An embodiment of the inventive concept includes a system, comprising: a computer; a first storage device coupled to the computer; a second storage device coupled to the computer; a data structure stored in a storage coupled to the computer, the data structure including: an identifier of an object including a hash; and a tuple including a device identifier for one of the first storage device and the second storage device and a location on the device; and a second data structure stored in the storage coupled to the computer, the second data structure including: a second identifier of the object; and the hash.

An embodiment of the inventive concept includes a system, comprising: a computer including a processor that can execute a kernel; a first storage device coupled to the computer; a second storage device coupled to the computer; and a data structure stored in a storage coupled to the computer, the data structure including: an identifier of an object; and a tuple including a device identifier for one of the first storage device and the second storage device and a location on the device, wherein the kernel is operative to allocate memory for an object from the first storage and the second storage.

An embodiment of the inventive concept includes a system, comprising: a computer including a processor that can execute a kernel; a first storage device coupled to the computer; a second storage device coupled to the computer; and a data structure stored in a storage coupled to the computer, the data structure including: an identifier of an object; and a tuple including a device identifier for one of the first storage device and the second storage device, a location on the device, and an access counter, wherein the kernel is operative to allocate memory for an object from the first storage and the second storage, and wherein the kernel is further operative to migrate the object from the first storage to the second storage if the access counter crosses a threshold.

An embodiment of the inventive concept includes a system, comprising: a computer including a processor that can execute a kernel; a first storage device coupled to the computer, the first storage including a secure area; a second storage device coupled to the computer; and a data structure stored in a storage coupled to the computer, the data structure including: an identifier of an object; and a tuple including a device identifier for one of the first storage device and the second storage device and a location on the device, wherein the kernel is operative to allocate memory for an object from the first storage and the second storage, and wherein the kernel is operative to allocate storage from the first storage in the secure area if the object is considered secure.

An embodiment of the inventive concept includes a method, comprising: receiving at a processor a request to access data for an object, the request including an identifier of the object; using an object table, translating the identifier of the object to a tuple, the tuple including an identifier of a device and a location on the device; and accessing the data using the identifier of the device and the location on the device.

An embodiment of the inventive concept includes a method, comprising: receiving a request to allocate memory for an object; requesting a kernel to allocate the memory for the object; receiving from the kernel an identifier of the object; adding an entry to an object table associating the identifier of the object with a tuple, the tuple including an identifier of a device and a location on the device; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object; hashing data for the object to generate a hash; requesting a kernel to allocate the memory for the object; receiving from the kernel an identifier of the object; adding an entry to a hash table associating the identifier of the object with the hash; adding an entry to an object table associating the identifier of the object with a tuple, the tuple including an identifier of a device, a location on the device, and the hash; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object; hashing data for the object to generate a hash; checking the object table to see if the object table already includes the hash; if the object table already includes the hash, not requesting the kernel to allocate the memory for the object; requesting a kernel to allocate the memory for the object; receiving from the kernel an identifier of the object; adding an entry to a hash table associating the identifier of the object with the hash; adding an entry to an object table associating the identifier of the object with a tuple, the tuple including an identifier of a device, a location on the device, and the hash; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object, the request including metadata pertinent to the object; requesting a kernel to allocate the memory for the object according to the metadata; receiving from the kernel an identifier of the object; adding an entry to an object table associating the identifier of the object with a tuple, the tuple including an identifier of a device and a location on the device; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object, the request including metadata pertinent to the object; requesting a kernel to allocate the memory for the object according to the metadata; receiving from the kernel an identifier of the object; adding an entry to an object table associating the identifier of the object with a tuple, the tuple including an identifier of a device, a location on the device, and the metadata; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object, the request including metadata pertinent to the object, the metadata drawn from a set including a size of the object, a persistence of the object, a security for the object, a sharing for the object, a hash for the object, and an access counter; requesting a kernel to allocate the memory for the object according to the metadata; receiving from the kernel an identifier of the object; adding an entry to an object table associating the identifier of the object with a tuple, the tuple including an identifier of a device and a location on the device; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object, the request specifying that the object is secure; requesting a kernel to allocate the memory for the object in a secure location on a device; receiving from the kernel an identifier of the object; adding an entry to an object table associating the identifier of the object with a tuple, the tuple including an identifier of the device, a location on the device, and an indicator that the object is secure; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving a request to allocate memory for an object, the request specifying that the object is secure and an indicator of a security process; requesting a kernel to allocate the memory for the object in a secure location on a device using the security process; receiving from the kernel an identifier of the object; adding an entry to an object table associating the identifier of the object with a tuple, the tuple including an identifier of the device, a location on the device, and an indicator that the object is secure; receiving at a processor a second request to access data for the object, the request including the identifier of the object; using the object table, translating the identifier of the object to the tuple; and accessing the data using the identifier of the device and the location on the device.

An embodiment of the inventive concept includes a method, comprising: receiving at a processor a request to access data for an object, the request including an identifier of the object; using an object table, translating the identifier of the object to a tuple, the tuple including an identifier of a device and a location on the device; accessing the data using the identifier of the device and the location on the device; receiving a third request to de-allocate memory for the object; requesting a kernel to de-allocate the memory for the object; and removing an entry from the object table associating the identifier of the object with the tuple.

An embodiment of the inventive concept includes a method, comprising: receiving at a processor a request to access data for an object, the request including an identifier of the object; using an object table, translating the identifier of the object to a tuple, the tuple including an identifier of a device, a location on the device, and an access counter; accessing the data using the identifier of the device and the location on the device; incrementing the access counter; and if the access counter crosses a threshold: requesting a kernel to allocate the memory for the object in a second device; migrating the data from the first device to the second device; releasing the memory for the object in the device; and updating the tuple in the object table to associate the second device and a second location on the second device with the object identifier.

An embodiment of the inventive concept includes a method, comprising: receiving at a processor a request to access data for an object, the request including a unique identifier of the object drawn from a global identifier space; using an object table, translating the identifier of the object to a tuple, the tuple including an identifier of a device and a location on the device; and accessing the data using the identifier of the device and the location on the device.

An embodiment of the inventive concept includes a method, comprising: receiving a request to allocate memory for an object; requesting a kernel to allocate the memory for the object; receiving from the kernel an identifier of the object; and adding an entry to an object table associating the identifier of the object with a tuple, the tuple including an identifier of a device and a location on the device.

An embodiment of the inventive concept includes a method, comprising: receiving a request to allocate memory for an object; hashing data in the object to generate a hash requesting a kernel to allocate the memory for the object; receiving from the kernel an identifier of the object; adding an entry to a hash table associating the identifier of the object with the hash; and adding an entry to an object table associating the identifier of the object with a tuple, the tuple including the hash, an identifier of a device and a location on the device.

An embodiment of the inventive concept includes a method, comprising: receiving a request to allocate memory for an object; hashing data in the object to generate a hash requesting a kernel to allocate the memory for the object; checking an object table to see if the object table already includes the hash; if the object table already includes the hash, not requesting the kernel to allocate the memory for the object; receiving from the kernel an identifier of the object; adding an entry to a hash table associating the identifier of the object with the hash; and adding an entry to the object table associating the identifier of the object with a tuple, the tuple including the hash, an identifier of a device and a location on the device.

An embodiment of the inventive concept includes a method, comprising: receiving a request to allocate memory for an object, the request including metadata pertinent to the object; requesting a kernel to allocate the memory for the object according to the metadata; receiving from the kernel an identifier of the object; and adding an entry to an object table associating the identifier of the object with a tuple, the tuple including an identifier of a device and a location on the device.

An embodiment of the inventive concept includes a method, comprising: receiving a request to allocate memory for an object, the request including metadata pertinent to the object; requesting a kernel to allocate the memory for the object according to the metadata; receiving from the kernel an identifier of the object; and adding an entry to an object table associating the identifier of the object with a tuple, the tuple including an identifier of a device, a location on the device, and the metadata.

An embodiment of the inventive concept includes a method, comprising: receiving a request to allocate memory for an object, the request including metadata pertinent to the object; requesting a kernel to allocate the memory for the object according to the metadata; receiving from the kernel an identifier of the object; and adding an entry to an object table associating the identifier of the object with a tuple, the tuple including an identifier of a device, a location on the device, and the metadata, the metadata drawn from a set including a size of the object, a persistence of the object, a security for the object, a sharing for the object, a hash for the object, and an access counter.

An embodiment of the inventive concept includes a method, comprising: receiving a request to allocate memory for an object, the request specifying that the object is secure; requesting a kernel to allocate the memory for the object in a secure location on a device; receiving from the kernel an identifier of the object; and adding an entry to an object table associating the identifier of the object with a tuple, the tuple including an identifier of the device, a location on the device, and an indicator that the object is secure.

An embodiment of the inventive concept includes a method, comprising: receiving a request to allocate memory for an object, the request specifying that the object is secure and an indicator of a security process; requesting a kernel to allocate the memory for the object in a secure location on a device using the security process; receiving from the kernel an identifier of the object; and adding an entry to an object table associating the identifier of the object with a tuple, the tuple including an identifier of the device, a location on the device, and an indicator that the object is secure.

The following discussion is intended to provide a brief, general description of a suitable machine in which certain aspects of the inventive concept may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the inventive concept with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the inventive concept to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A memory management device, comprising:
   a memory;
   a data structure stored in the memory, the data structure including:
      an identifier of an object, wherein the identifier of the object is a hash; and
      a tuple including an identifier of a physical device and a location on the physical device; and
   a second data structure, the second data structure including:
      a second identifier of the object; and
      the hash,
   wherein the object is stored on one of a plurality of physical devices including at least one volatile storage device and at least one non-volatile storage device,
   wherein the second data structure maps the second identifier of the object to the hash and the data structure maps the hash to the tuple to access the object
   wherein data for the object may be accessed on behalf of an application or an operating system using the second identifier of the object, and
   wherein the memory management device uses the second identifier of the object, the data structure, and the second data structure to determine the identifier of the physical device and the location on the physical device in the tuple.

2. The memory management device according to claim 1, wherein the tuple further includes metadata, wherein the metadata is drawn from a set including a security of the object and a sharing of the object.

3. A system, comprising:
   a computer;
   a first physical storage device coupled to the computer;
   a second physical storage device coupled to the computer;
   a data structure stored in a storage coupled to the computer, the data structure including:
      an identifier of an object, wherein the identifier of the object is a hash; and
      a tuple including an identifier of one of the first physical storage device and the second physical storage device and a location on the device identified by the identifier; and
   a second data structure stored in the storage coupled to the computer, the second data structure including:
      a second identifier of the object; and
      the hash,
   wherein the object is stored on either of the first physical storage device and the second physical storage device,
   wherein the first physical storage device includes a volatile storage device,
   wherein the second physical storage device includes a non-volatile storage device, and
   wherein the second data structure maps the second identifier of the object to the hash and the first data structure maps the hash to the tuple to access the object
   wherein data for the object may be accessed on behalf of an application or an operating system using the second identifier of the object, and
   wherein the memory management device uses the second identifier of the object, the data structure, and the second data structure to determine the one of the first physical storage device and the second physical storage device and the location on the device in the tuple.

4. The system according to claim 3, wherein the tuple further includes metadata, the metadata drawn from a set including a security of the object and a sharing of the object.

5. The system according to claim 3, wherein:
   the computer includes a processor that may execute a kernel; and
   the kernel is operative to allocate memory for an object from the first physical storage device and the second physical storage device.

6. The system according to claim 5, wherein:
   the tuple further includes an access counter; and
   the kernel is further operative to migrate the object from the first physical storage device to the second physical storage device if the access counter crosses a threshold.

7. The system according to claim 5, wherein:
   the first physical storage device includes a secure area, the secure area in the first physical storage including a fenced area; and
   the kernel is operative to allocate storage from the first physical storage device in the secure area if the object is considered secure.

8. A method, comprising:
   receiving at a processor a request from an application or an operating system to access data for an object, the request including an identifier of the object;
   using a hash table, translating the identifier of the object to a hash;
   using an object table, translating the hash to a tuple, the tuple including an identifier of a physical device and a location on the physical device; and accessing the data on behalf of the application or the operating system using the identifier of the physical device and the location on the physical device in the tuple, wherein the physical device is drawn from a set including a volatile storage device and a non-volatile storage device, and wherein the method may support storage of data in both of the volatile storage device and the non-volatile storage device.

9. The method according to claim 8, the method further comprising:

receiving a second request to allocate memory for the object;

requesting a kernel to allocate the memory for the object;

receiving from the kernel the identifier of the object; and adding an entry to the object table associating the hash with the tuple.

10. The method according to claim 9, further comprising:

hashing the data to generate the hash; and adding an entry to the hash table associating the identifier of the object with the hash.

11. The method according to claim 10, further comprising:

checking the object table to see if the object table already includes the hash; and if the object table already includes the hash, not requesting the kernel to allocate the memory for the object.

12. The method according to claim 9, wherein:

receiving a second request to allocate memory for the object includes receiving the second request to allocate the memory for the object, the second request including metadata pertinent to the object, the metadata drawn from a set including a security of the object and a sharing of the object; and requesting a kernel to allocate the memory for the object includes requesting the kernel to allocate the memory for the object according to the metadata.

13. The method according to claim 12, wherein adding an entry to the object table associating the hash with the tuple includes adding the entry to the object table associating the hash with the tuple, the tuple including the metadata.

14. The method according to claim 9, wherein:

receiving a second request to allocate memory for the object includes receiving the second request to allocate the memory for the object, the second request specifying that the object is secure;

requesting a kernel to allocate the memory for the object includes requesting the kernel to allocate the memory for the object in a secure location on the physical device, the secure location on the physical device including a fenced area; and adding an entry to the object table includes adding the entry to the object table associating the identifier of the object with the tuple, the tuple further including an indicator that the object is secure.

15. The method according to claim 14, wherein:

receiving the second request to allocate memory for the object includes receiving, from the application or the operating system, the second request to allocate the memory for the object, the second request specifying that the object is secure and an indicator of a security process; and requesting a kernel to allocate the memory for the object includes requesting the kernel to allocate the memory for the object in a secure location on the physical device using the security process.

16. The method according to claim 8, the method further comprising:

receiving a third request to de-allocate memory for the object;

requesting a kernel to de-allocate the memory for the object; and removing an entry from the object table associating the identifier of the object with the tuple.

17. The method according to claim 8, wherein:

translating the hash to a tuple includes translating the hash to the tuple, the tuple including the identifier of the physical device, the location on the physical device, and an access counter; and the method further comprises:

incrementing the access counter; and if the access counter crosses a threshold:

requesting a kernel to allocate the memory for the object in a second physical device;

migrating the data from the first physical device to the second physical device;

releasing the memory for the object in the physical device; and updating the tuple in the object table to associate the second physical device and a second location on the second physical device with the hash.

18. The method according to claim 8, wherein receiving at a processor a request to access data for an object includes receiving at the processor the request to access data for the object, the identifier for the object including a unique identifier drawn from a global identifier space.

19. The memory management device according to claim 1, wherein the application or the operating system that may access the object does not know whether the object is stored in the volatile storage device or the non-volatile storage device.

20. The system according to claim 3, wherein the application or the operating system that may access the object does not know whether the object is stored in the volatile storage device or the non-volatile storage device.

21. The method according to claim 8, wherein the application or the operating system that may access the object does not know whether the object is stored in the volatile storage device or the non-volatile storage device.

22. The memory management device according to claim 1, wherein the second data structure maps both the second identifier of the object and a third identifier of the object to the hash.

23. The system according to claim 3, wherein the second data structure maps both the second identifier of the object and a third identifier of the object to the hash.

* * * * *